(12) United States Patent
Shimazu et al.

(10) Patent No.: US 6,278,586 B1
(45) Date of Patent: Aug. 21, 2001

(54) RECORDING/REPRODUCING DEVICE WITH READ/WRITE HEAD CARRIAGE SUPPORTING VOICE COIL OF VOICE COIL MOTOR FOR DRIVING THE CARRIAGE ASSEMBLY

(75) Inventors: Teruo Shimazu, Atsugi; Toshiharu Shimizu, Machida; Yoshihide Majima, Hatano; Toshimitsu Itoh, Atsugi, all of (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/562,883

(22) Filed: May 1, 2000

Related U.S. Application Data

(62) Division of application No. 08/863,741, filed on May 27, 1997, now Pat. No. 6,084,750.

(30) Foreign Application Priority Data

May 27, 1996 (JP) .................................... 8-131836
May 27, 1996 (JP) .................................... 8-131919
May 27, 1996 (JP) .................................... 8-132344
May 27, 1996 (JP) .................................... 8-132347

(51) Int. Cl.[7] ...................................... G11B 5/55
(52) U.S. Cl. ................... 360/266.9; 360/266.5; 360/266.7
(58) Field of Search ............... 360/266.4, 266.5, 360/266.7, 266.8, 266.9

(56) References Cited

U.S. PATENT DOCUMENTS

| | | | |
|---|---|---|---|
| 4,414,594 | * 11/1983 | Farmer et al. | 360/106 |
| 4,710,836 | 12/1987 | Hishi . | |
| 4,992,684 | 2/1991 | Matsui . | |
| 5,138,605 | 8/1992 | Shtipelman et al. . | |
| 5,299,083 | 3/1994 | Kawada . | |
| 5,504,636 | 4/1996 | Yuki et al. . | |
| 5,818,666 | 10/1998 | Chaya . | |

* cited by examiner

Primary Examiner—Robert S. Tupper
(74) Attorney, Agent, or Firm—Frishauf, Holtz, Goodman, Langer & Chick, P.C.

(57) ABSTRACT

In a recording/reproducing device for use in recording and reproducing data on and from a recording medium while moving read/write head means relative to the recording medium in a moving direction, which comprises a carriage supporting the read/write head means and guided by a guiding member in the moving direction, and a voice coil motor comprising a voice coil and a magnetic circuit device for driving the carriage in the moving direction. The carriage has a coil holding portion by which the voice coil is fixedly held in the condition that the coil axis is arranged in the moving direction. The voice coil is applied with a driving electric current for driving the carriage. The magnetic circuit device is fixedly disposed adjacent to the voice coil to generate a magnetic field intersecting the driving current flowing through the voice coil, the voice coil moving in the moving direction together with the carriage by an interaction of the driving current and the magnetic field.

1 Claim, 9 Drawing Sheets

RECORDING/REPRODUCING DEVICE WITH READ/WRITE HEAD CARRIAGE SUPPORTING VOICE COIL OF VOICE COIL MOTOR FOR DRIVING THE CARRIAGE ASSEMBLY

This appln is a Divisional of Ser. No. 08/863,741 filed May 27, 1997, U.S. Pat. No. 6,084,750.

BACKGROUND OF THE INVENTION

This invention relates to a recording/reproducing device for recording and reproducing data on and from a recording medium through a read/write head and, in particular, to a recording/reproducing mechanism for driving a carriage assembly with the read/write head mounted thereon by a voice coil motor in a predetermined direction relative to the recording medium.

As a typical one of such a recording/reproducing device, there is well known in the prior art a disk drive for recording and reproducing data on and from a magnetic recording medium by a magnetic head. The magnetic recording medium is a so called flexible disk and is usually housed in a hard case or a cartridge. The cartridge containing the flexible disk is called a floppy disk. In recent years, the storage capacity of the flexible disk has increased. Development has been made of those flexible disks having a storage capacity as large as 128 megabytes in contrast with those having a storage capacity on the order between one and two megabytes. The former and the latter flexible disks will hereafter be referred to as large-capacity flexible and normal-capacity flexible disks, respectively. Following such remarkable increase in storage capacity, an improved disk drive has also been developed so as to deal with the large-capacity flexible disks.

The disk drive for use with the normal-capacity flexible disks is different in mechanism from that intended for use with the large-capacity flexible disks. One such difference lies in the structure of a driving mechanism for driving a carriage assembly with a magnetic head relative to the flexible disk received in the disk drive. More specifically, the disk drive for the normal-capacity flexible disks uses a stepping motor as the driving mechanism on the other hand, the disk drive for the large-capacity flexible disks uses a linear motor such as a voice coil motor (VCM).

The carriage assembly is moved in a carriage moving direct ion which is a predetermined radial direction of the flexible disk.

The voice coil motor used as the driving mechanism in the disk drive for the large-capacity flexible disks comprises a pair of voice coils fixedly mounted on both sides of the carriage assembly each having a coil axis arranged in the carriage moving direction, and a pair of magnetic circuit devices fixedly disposed adjacent the voice coils, respectively, each for generating a magnetic field in a direction intersecting an electric current flowing through each of the voice coils.

Each of the magnetic circuit devices typically comprises a permanent magnet polarized along its thickness, and a yoke member. The yoke member comprises a center yoke, a back yoke, and a pair of side yokes. The center yoke extends in the carriage moving direction and passes through the corresponding one of the voice coils along the coil axis. The back yoke extends in parallel to the center yoke at a certain distance therefrom and has a principal surface faced to the center yoke. The side yokes connect the center yoke with the back yoke at their one ends and the other ends to establish an endless form. The permanent magnet is fixedly attached to the principal surface of the back yoke. Each of the center yoke, the back yoke, and the side yokes is made of a steel plate having a thickness of at least 3 mm.

The magnetic circuit device produces the magnetic field across a space between the center yoke and the back yoke. The electric current flows through the voice coil in a direction intersecting the magnetic field. The interaction between the electric current and the magnetic field produces driving force to drive the voice coil in the carriage moving direction along the center yoke. In this manner, the carriage assembly is moved in the carriage moving direction in response to the driving force of the voice coil motor.

Thus, a combination of the voice coil motor and the carriage assembly serves as a magnetic recording/reproducing mechanism in the disk drive.

In the above-mentioned magnetic recording/reproducing mechanism, the magnetic circuit device of the voice coil motor comprises the yoke member composed of the center yoke, the back yoke, and the side yokes. Thus, the yoke member includes a relatively large number of components.

In the magnetic circuit device, the permanent magnet, the center yoke, the back yoke, and the side yokes are equal in width to one another. As described above, the voice coil motor produces the driving force by the interaction between the electric current flowing through the voice coil and the magnetic field produced by the magnetic circuit device. The intensity of the driving force depends on the magnitude of the electric current and the number of magnetic fluxes intersecting the voice coil. In order to increase the driving force, it is necessary either to increase the electric current flowing through the voice coil or to increase the number of the magnetic fluxes across the voice coil. However, the electric current to flow through the voice coil is limited in magnitude.

On the other hand, the magnetic field intersecting the voice coil, i.e., the number of the magnetic fluxes can be increased if the permanent magnet is made of an advanced magnetic material or if the permanent magnet, the center yoke, the back yoke, and the side yokes are increased in width. However, the use of the permanent magnet made of such an advanced magnetic material will increase the cost of the voice coil motor because the advanced magnetic material is expensive. On the other hand, the increase in width of the permanent magnet, the center yoke, the back yoke, and the side yokes inevitably increases the size and the weight of the voice coil motor.

In the disk drive, it is a general practice that the voice coil is fixed to a side wall of the carriage assembly by the use of an adhesive.

However, it is difficult to fix the voice coil to the carriage assembly with an accurate position. Furthermore, the voice coil is often disconnected or released from the carriage assembly because of deterioration of the adhesive resulting from various factors, such as generation of heat within the device and the lapse of time.

SUMMARY OF THE INVENTION

It is therefore an object of this invention to provide a recording/reproducing device with a voice coil motor having a magnetic circuit device with a reduced number of components.

It is another object of this invention to provide a recording/reproducing device with a cost-effective and small-sized voice coil motor capable of providing a sufficient driving force.

It is still another object of this invention to provide a recording/reproducing device in which a voice coil is accurately attached to a predetermined position of a carriage assembly.

It is yet another object of this invention to provide a recording/reproducing device in which a voice coil is securely coupled to a carriage assembly with improved reliability.

It is a further object of this invention to provide a recording/reproducing device in which a voice coil is attached to a carriage assembly over a wide area to achieve reliable coupling.

According to this invention, there is provided a recording/reproducing device for use in recording and reproducing data on and from a recording medium while moving read/write head means relative to the recording medium in a moving direction, which comprises a carriage supporting the read/write head means; guide means fixedly disposed and slidably supporting the carriage for guiding the carriage in the moving direction; a voice coil motor for driving the carriage in the moving direction, the voice coil motor comprising a voice coil having a coil axis and a magnetic circuit device generating a magnetic field; the carriage having a coil holding portion projecting therefrom, the voice coil being fixedly held on the coil holding portion in the condition that the coil axis is arranged in the moving direction, the coil being applied with a driving electric current for driving the carriage; and the magnetic circuit device fixedly disposed adjacent to the voice coil to generate a magnetic field intersecting the driving current flowing through the voice coil, the voice coil moving in the moving direction together with the carriage by an interaction of the driving current and the magnetic field.

DESCRIPTION OF THE PREFERRED EMBODIMENTS

Figure 1:
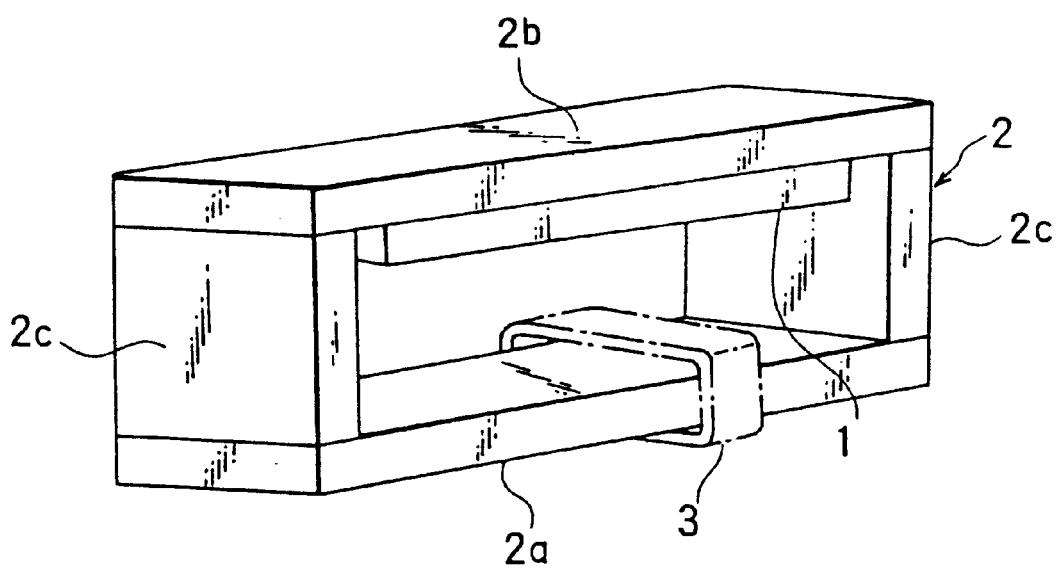
FIG. 1 is a perspective view of a voice coil motor in a known disk drive.

In order to facilitate an understanding of this invention, a voice coil motor in a known disk drive will at first be described with reference to FIG. 1. The voice coil motor comprises a magnetic circuit device and a voice coil 3 which is fixed to a side wall of a carriage assembly (not shown) by an adhesive agent. The magnetic circuit device comprises a permanent magnet 1 magnetized in a direction of its thickness, and a yoke member 2. The yoke member 2 comprises a center yoke 2a, a back yoke 2b, and a pair of side yokes 2c. The center yoke 2a extends in an extending direction coincident with a moving direction of the carriage assembly and passes through the voice coil 3. The back yoke 2b extends in parallel to the center yoke 2a at a certain distance therefrom and has a principal surface faced to the center yoke 2a. The side yokes 2c are connected to the center yoke 2a and the back yoke 2b at their one ends and the other ends to establish magnetic connection therebetween. The permanent magnet 1 is fixedly attached to the principal surface of the back yoke 2b. Each of the center yoke 2a, the back yoke 2b, and the side yokes 2c is made of a steel plate having a thickness of at least 3 mm.

The magnetic circuit device produces a magnetic field across a space between the center yoke 2a and the back yoke 2b. An electric current flows through the voice coil 3 in a direction intersecting the magnetic field. The interaction between the electric current and the magnetic field produces a driving force to drive the voice coil 3 in the extending direction of the center yoke 2a, that is, the moving direction of the carriage assembly. In this manner, the carriage assembly is moved in the moving direction in response to the driving force of the voice coil motor.

Thus, a combination of the voice coil motor and the carriage assembly serves as the magnetic recording/reproducing mechanism in the disk drive.

However, the known disk drive has problems as described in the preamble.

Figure 2:
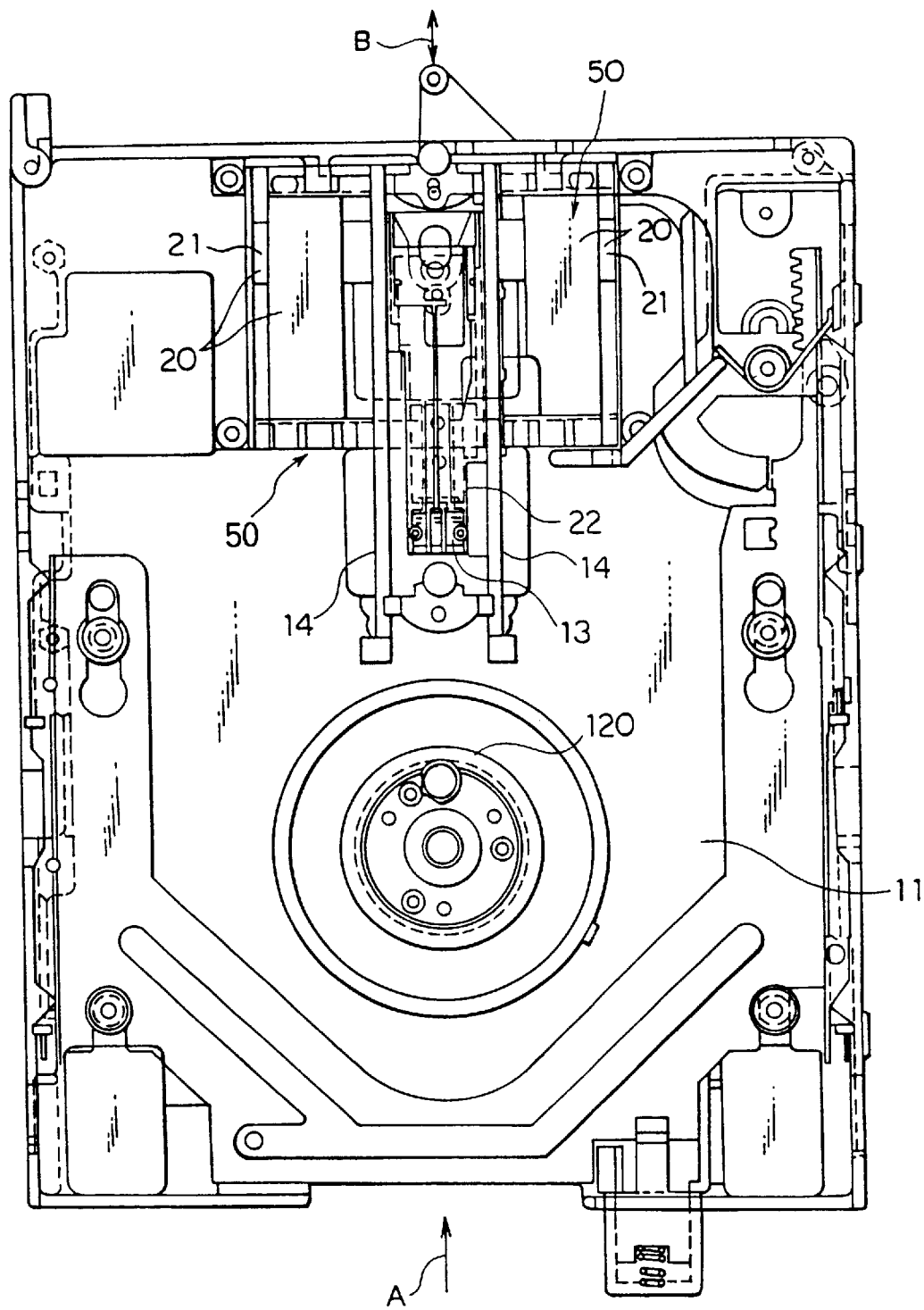
FIG. 2 is a plan view illustrating an internal structure of a disk drive to which a magnetic recording/reproducing mechanism according to a first embodiment of this invention is applied.

Now referring to FIG. 2, description will be made as regards a magnetic recording/reproducing device according to a first embodiment of this invention. The magnetic recording/reproducing device is a disk drive for recording and reproducing data on and from a normal-capacity or a large-capacity flexible disk (not shown). The flexible disk is inserted into the disk drive from a direction indicated by an arrow A in FIG. 2 and is held by a disk table assembly 120 which is rotatably supported on a main frame 11. The disk table assembly 120 is rotated by a disk drive motor (not shown) disposed on a back surface of the main frame 11. The flexible disk is rotated in response to the rotation of the disk table assembly 120. The main frame 11 is also provided on the back surface thereof with a printed wiring board (not shown) on which a number of electronic parts are mounted.

The disk drive comprises a pair of upper and lower magnetic heads (not shown) for recording and reproducing data on and from opposite surfaces of the flexible disk. The magnetic heads are supported by a carriage assembly 22 through a pair of upper and lower gimbal plates collectively depicted at 13 in FIG. 2. The carriage assembly 22 is positioned above the main frame 11 at a distance from the main frame 11. The carriage assembly 22 holds the magnetic heads so that the magnetic heads are moved in a predetermined direction (depicted by an arrow B in FIG. 2) with respect to the flexible disk. The predetermined direction is a radial direction of the flexible disk. As will later be described, the carriage assembly 22 is supported and guided at both lateral sides thereof by a pair of guide bars 14 extending in the predetermined direction B.

The carriage assembly 22 is driven in the predetermined direction B by a voice coil motor 20. The voice coil motor 20 is positioned at a rear portion of the disk drive. The voice coil motor 20 comprises a voice coil 21, and a pair of magnetic circuit devices 50 each of which is for generating a magnetic field in a direction intersecting an electric current flowing through the voice coil 21.

Figure 3:
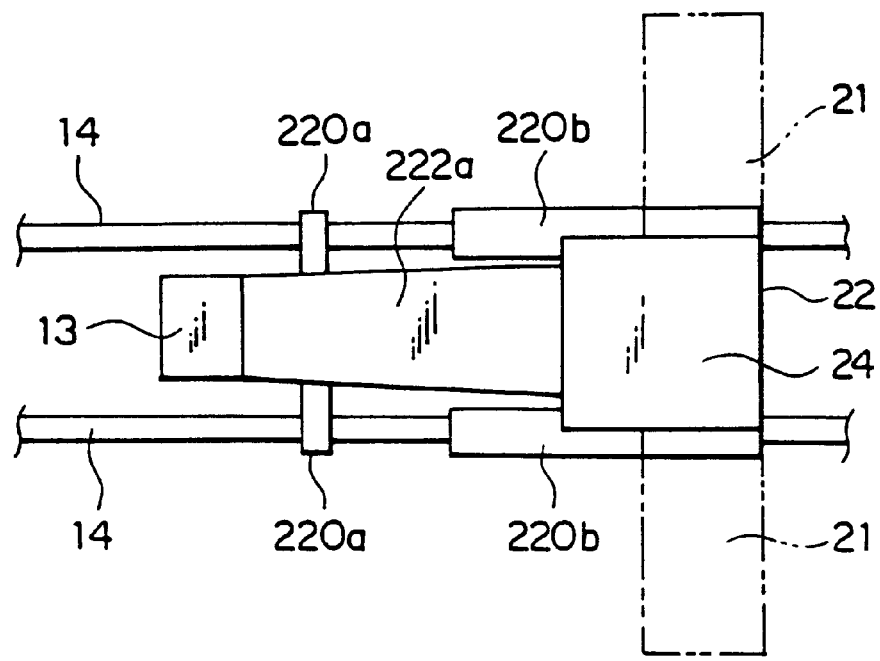
FIG. 3 is a schematic plan view of a carriage assembly in FIG. 2.
Figure 4:
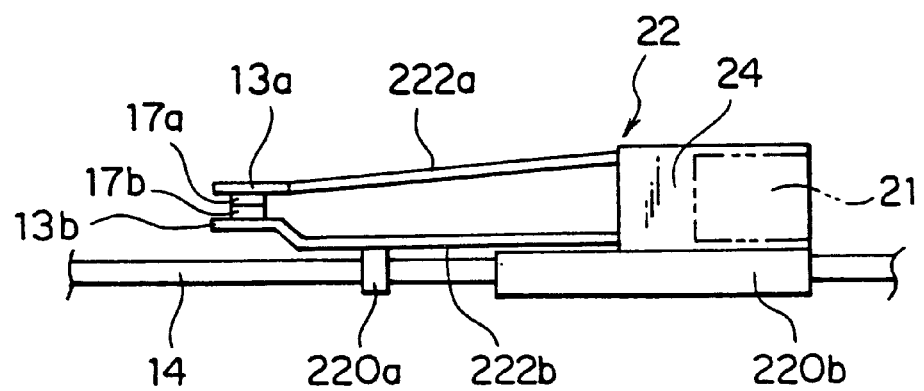
FIG. 4 is a schematic side view of the carriage assembly in FIG. 3.

Referring to FIGS. 3 and 4 in addition, the carriage assembly 22 comprises a carriage body 24 of a resin material, an upper carriage 222a, and a lower carriage 222b. The upper and the lower gimbal plates depicted at 13a and 13b are formed at free ends of the upper and the lower carriages 222a and 222b, respectively. The voice coil 21 is integrally coupled to the carriage body 24 on the both lateral sides thereof. The upper and the lower gimbal plates 13a and 13b hold the upper and the lower magnetic heads depicted at 17a and 17b in FIG. 4, respectively. A first projecting member 220a projects from the lower carriage 222b on both lateral sides thereof. Likewise, a second projecting member 220b projects from the carriage body 24 on the both lateral sides thereof at its lower portion. The guide bars 14 extend in parallel to each other in the predetermined direction B and pass through the first and the second projecting members 220a and 220b. The upper carriage 222a is pivotable around a fixed end connected to the carriage body 24.

Referring to FIGS. 2 and 5 through 8, the magnetic recording/reproducing mechanism according to the first embodiment of this invention will be described in detail. The magnetic recording/reproducing mechanism illustrated in FIG. 2 comprises the voice coil motor 20 and the carriage assembly 22 coupled thereto. The voice coil motor 20 comprises a voice coil 21 and a pair of the magnetic circuit devices 50.

Each of the magnetic circuit devices 50 comprises a permanent magnet 200 magnetized in a direction of its thickness, and a yoke member. The yoke member comprises a center yoke 202 and a back yoke 203. The center yoke 202 is fixedly disposed to extend in the predetermined direction B or a moving direction of the carriage assembly 22 and passes through the voice coil 21. The back yoke 203 extends in parallel to the center yoke 202 at a certain distance therefrom and has a principal surface 203a faced to the center yoke 202. The back yoke 203 has end portions 203b each of which is bent downward by means of press working to form a generally right angle. The end portions 203b are physically and magnetically connected to corresponding ends of the center yoke 202 to form an endless-shape member. A permanent magnet 200 is fixedly attached to the principal surface 203a of the back yoke 203. Each of the center yoke 202 and the back yoke 203 is made of a steel plate having a thickness of at least 3 mm.

The center yoke 202, the back yoke 203, the permanent magnet 200 have a center yoke width Wc, a back yoke width Wb, and a magnet width Wm (Wm is not indicated in FIG. 5), respectively. Each of the magnet width Wm and the back yoke width Wb are greater than the center yoke width Wc. In this embodiment, the magnet width Wm is equal to the back yoke width Wb. With this structure, the magnetic field effectively acts on the voice coil 21 with a greater number of magnetic fluxes. Therefore, sufficient driving force is assured with a less number of components without the side yokes in the conventional mechanism.

The magnetic recording/reproducing mechanism comprising a combination of the voice coil motor 20 and the carriage assembly 22 will be described in detail with reference to FIGS. 6 through 8.

The carriage body 24 is connected through a pair of carriage spring portions 221 to the upper and the lower carriages 222a and 222b, respectively. The lower carriage 222b is not illustrated in FIGS. 7 and 8.

The first and the second projecting members 220a and 220b are slidably coupled to the guide bars 14 extending in the predetermined direction B. Thus, the carriage assembly 22 is movable in the predetermined direction B.

The carriage spring portions 221 having elasticity are fixed at their one ends to upper and lower surfaces of the carriage body 24, respectively, through plate members 223 and bolts 224. The other ends of the carriage spring portions 221 are fixedly connected to one ends of the upper and the lower carriages 222a and 222b, respectively. Thus, the upper and the lower carriages 222a and 222b are elastically supported by the carriage spring portions 221. As illustrated in FIG. 4, the upper and the lower magnetic heads 17a and 17b are attached to inner surfaces of the upper and the lower gimbal plates 13a and 13b which are connected to the free ends of the upper and the lower carriages 222a and 222b, respectively.

Figure 6:
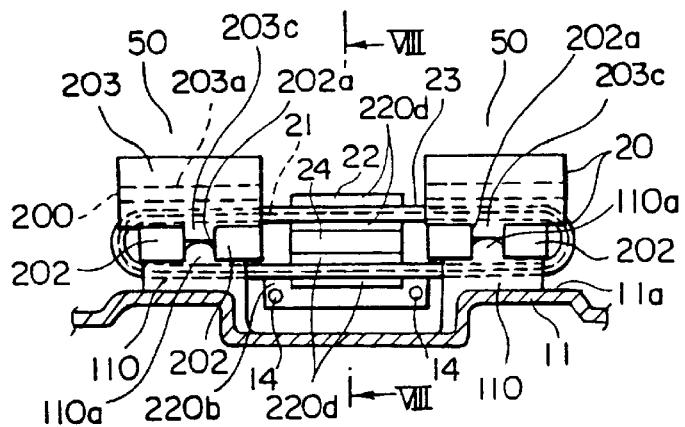
FIG. 6 is a side view of the magnetic recording/reproducing mechanism in FIG. 2.
Figure 7:
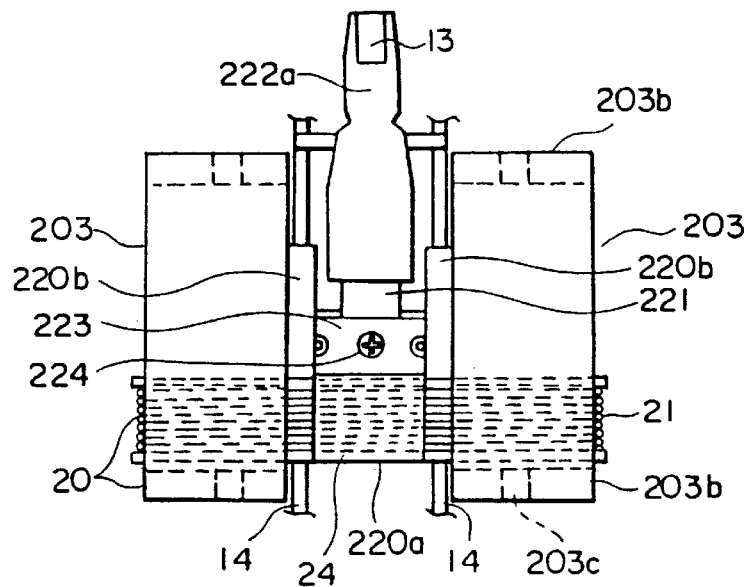
FIG. 7 is a plan view of the magnetic recording/reproducing mechanism in FIG. 6.
Figure 8:
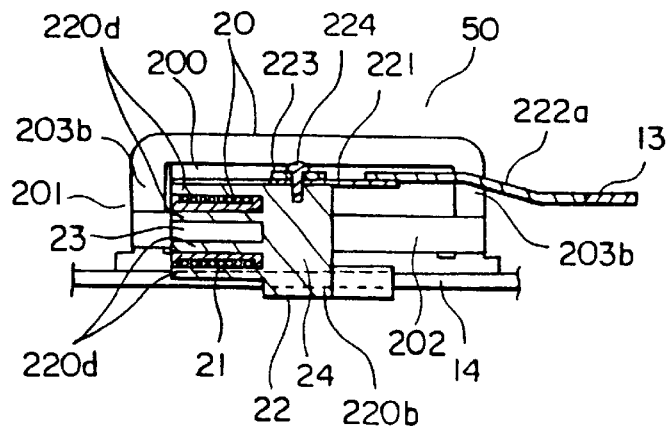
FIG. 8 is a sectional view taken along a line VIII—VIII in FIG. 6.

As shown in FIGS. 6 and 7, the voice coil 21 is wound on a bobbin 23. The bobbin 23 is a flat cylindrical shape comprising two confronting flat portions and two arc-shaped portions connecting the flat portions at both ends. The bobbin has a pair of flange portions 230 slightly protruding from the arc-shaped portions, respectively. The bobbin 23 surrounds collectively both of the center york.

The carriage body 24 has a pair of clamping portions 220d by which the bobbin 23 is clamped and supported. Therefore, the bobbin 23 serves as a coil holding portion of the carriage assembly, and the voice coil 23 can be reliably fixed to the carriage assembly through the bobbin. The voice coil 21 is preliminarily wound around the bobbin 23 before it is fixed to the carriage assembly 22. The bobbin 23 with the voice coil 21 wound therearound is fixed to the carriage assembly 22 and then fitted to the center yokes 202 to surround the center yokes 202 so that the bobbin 23 is movable in the longitudinal direction of the center yokes 202, namely, the predetermined direction B.

Figure 5:
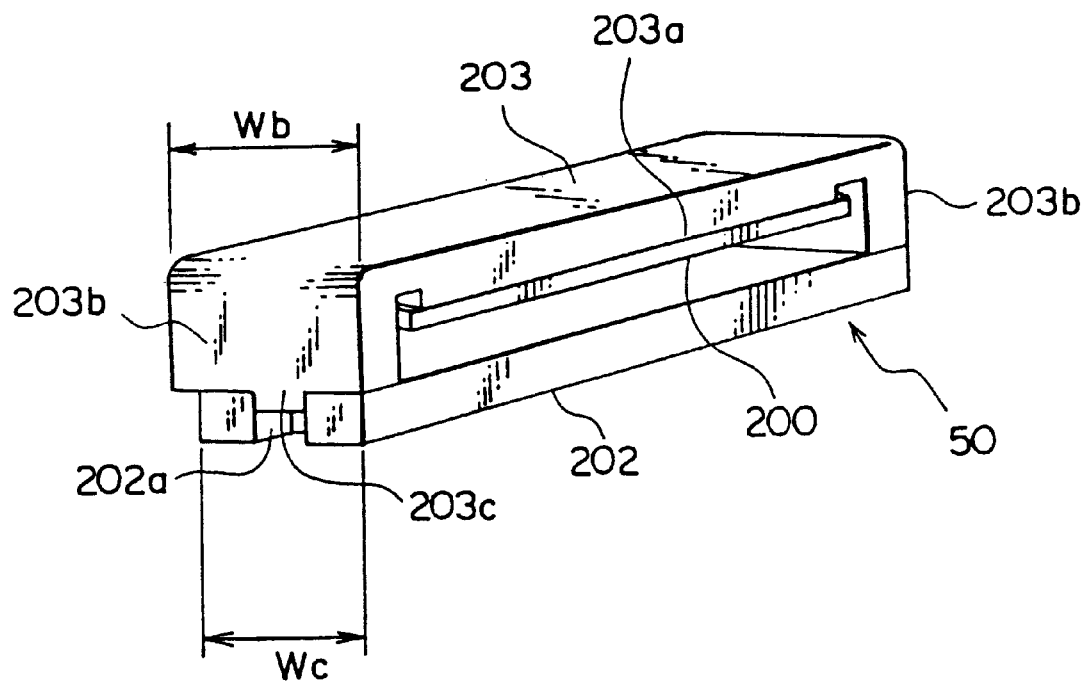
FIG. 5 is a perspective view of a magnetic circuit device of a voice coil motor in FIG. 2.

The main frame 11 has a pair of seating portions 110 for separating the magnetic circuit devices 50 from a principal surface 11a of the main frame 11. Each seating portion 110 has a pair of protrusions 110a upwardly protruding therefrom. Each protrusion 110a has a height smaller than the thickness of the center yoke 202. As illustrated in FIG. 5, each center yoke 202 has notches 202a formed at both ends thereof for fitting the protrusions 110a.

Thus, the protrusions 110a of the seating portion 110 serve to fixedly position the center yoke 202. Each of the back yokes 203 has a pair of protrusions 203c formed at both longitudinal ends thereof to be fitted in the notches 202a. Each protrusion 203 has a height substantially equal to a difference between the thickness of each center yoke 202 and the height of each protrusion 110a of each seating portion 110. Thus, the notches 202a of the center yoke 202 serve to position the back yoke 203.

In the voice coil motor 20 of the above-mentioned structure, the magnetic field is generated in each of spaces between the center yokes 202 and the back yokes 203. The electric current flows through the voice coil 21 in a direction intersecting the magnetic field to produce driving force in the longitudinal direction of the center yoke 202 as a result of interaction between the electric current and the magnetic field. The driving force moves the carriage assembly 22 in the predetermined direction B coincident with the longitudinal direction of the center yoke 202. The movement of the carriage assembly 22 moves the upper and the lower magnetic heads 17a and 17b (FIG. 4) relative to the flexible disk (not shown).

In the first embodiment, a pair of the magnetic circuit devices 50 are provided. However, use may also be made of a single magnetic circuit device 50 or three or more magnetic circuit devices 50. Although the center yokes 202 are collectively surrounded by a single bobbin 23 in the first embodiment, two bobbins 23 may be used to be slidably fitted on the center yokes 202, respectively.

It is a modification that the bobbin 23 is omitted and the voice coil 21 is hard to maintain a flat cylindrical shape similar to the bobbin. In that case, the voice coil is clamped and supported by the clamping portions 220d. The clamping potions serve as the coil holding portion of the carriage assembly.

Figure 9:
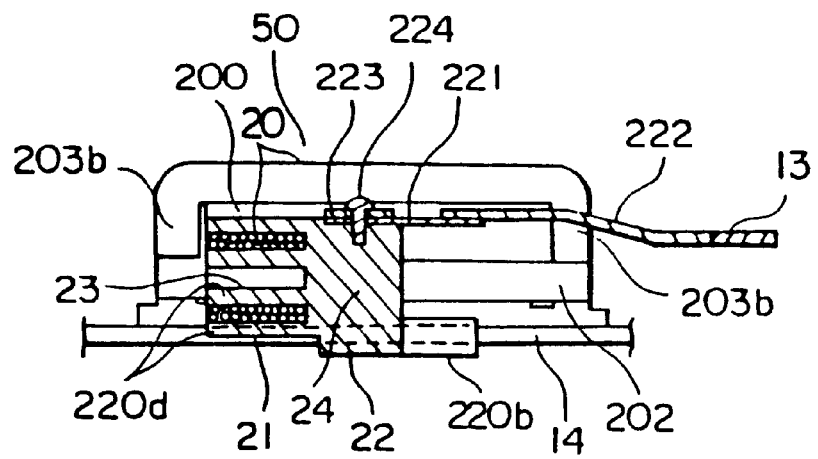
FIG. 9 is a sectional view of a magnetic recording/reproducing mechanism according to a second embodiment of this invention.

Referring to FIG. 9, a magnetic recording/reproducing mechanism according to a second embodiment of this invention is substantially similar to that of the first embodiment except that the bobbin 23 and the clamping portion of the carriage body 24 are integrally formed into a single body of plastic resin by a molding process. Similar parts are designated by like reference numerals and will not be described any longer.

In the first and the second embodiments, the voice coil 21 is fixed to the clamping portion 220d of the carriage assembly 22 by the use of an adhesive. Specifically, the adhesive is applied onto a predetermined portion of the voice coil 21. The voice coil 21 is then inserted in the clamping portions 220d. At this time, the voice coil 21 is accurately positioned by the clamping portions 220d with respect to the carriage assembly 22. Thereafter, the adhesive is solidified.

Thus, positioning and attachment of the voice coil 21 can be easily carried out in the first and the second embodiments by means of the clamping portions 220d.

Figure 10:
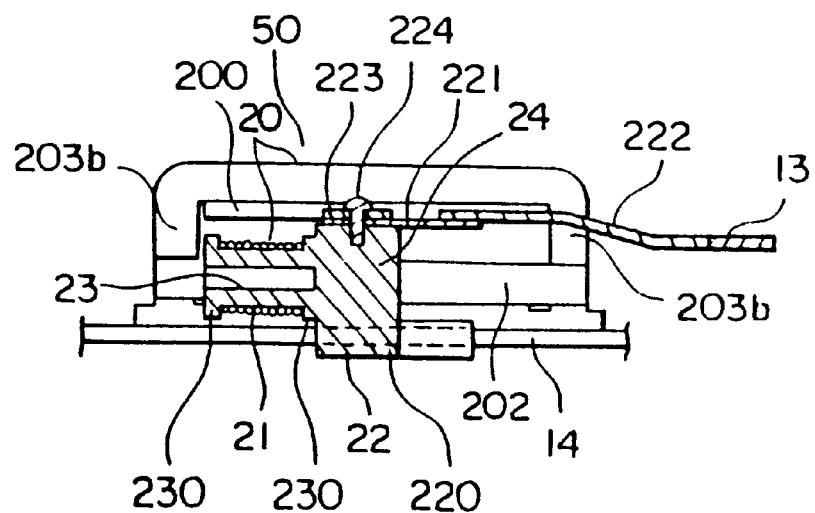
FIG. 10 is a sectional view of a magnetic recording/reproducing mechanism according to a third embodiment of this invention.

Referring to FIG. 10, a magnetic recording/reproducing mechanism according to a third embodiment of this invention is similar to the second embodiment except that the bobbin 23 and the carriage portion 24 are integrally formed into a single body by molding and that the bobbin 23 has flange portions 230 formed at both ends thereof to project outward. Similar parts are designated by like reference numerals and will not be described any longer.

In the third embodiment, positioning and attachment of the voice coil 21 can be easily carried out by means of the flange portions 230.

Figure 11:
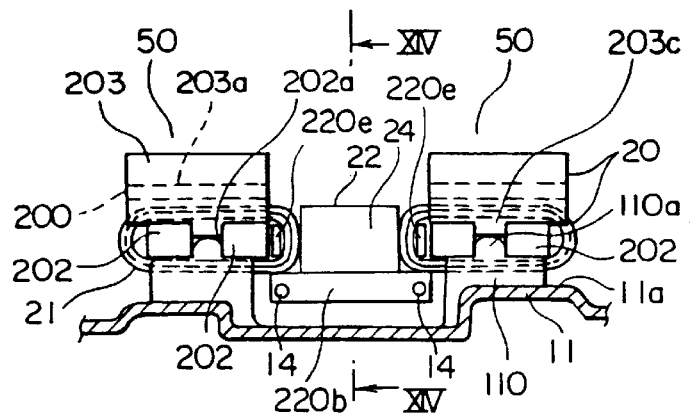
FIG. 11 is a front view of a magnetic recording/reproducing mechanism according to a fourth embodiment of this invention.
Figure 12:
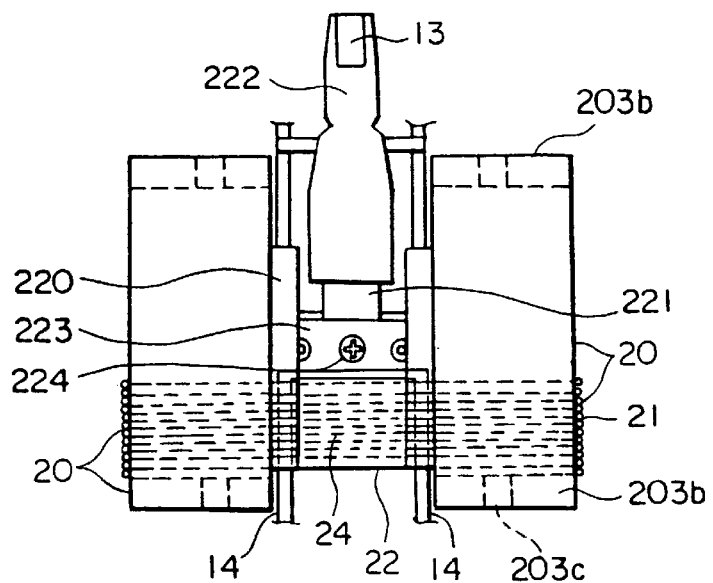
FIG. 12 is a plan view of the magnetic recording/reproducing mechanism in FIG. 11.
Figure 13:
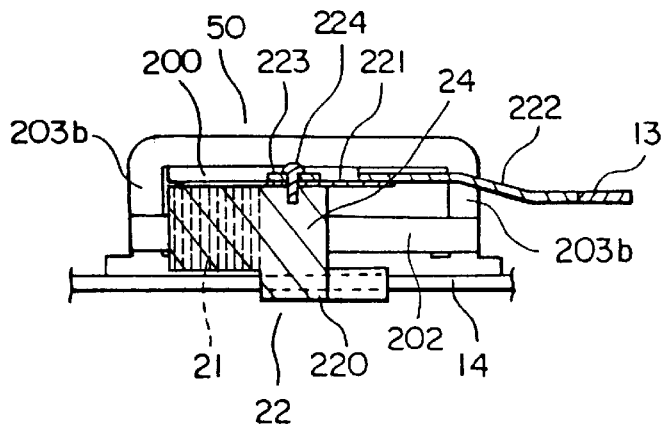
FIG. 13 is a sectional view taken along a line XIII—XIII in FIG. 11.
Figure 14:
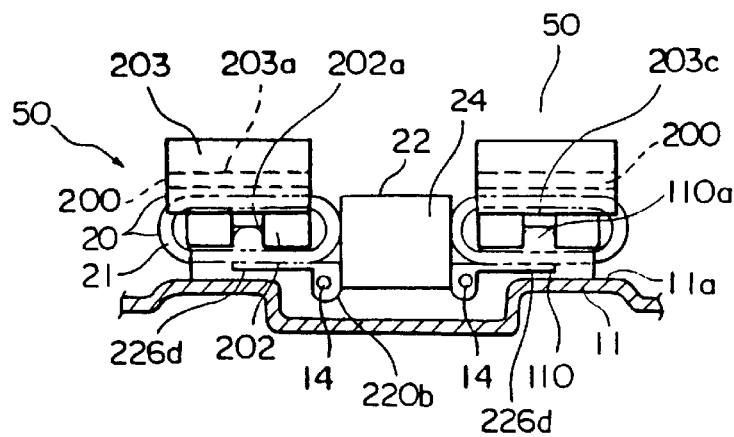
FIG. 14 is a front view of a magnetic recording/reproducing mechanism according to a fifth embodiment of this invention.

Referring to FIGS. 11 through 13, a magnetic recording/reproducing mechanism according to a fourth embodiment of the present invention is basically similar to the first embodiment. Similar parts are designated by like reference numerals and will not be described any longer.

In the fourth embodiment, a pair of the voice coils 21 are used and slidably fitted on the two center yokes 202, respectively. A pair of clamping portions 220e are formed on both side walls of the carriage body 24 of the carriage assembly 22 and clamp and support the voice coils 21, respectively. Each of the clamping portions 220e is an L-shaped member formed or mounted on the side wall with an end of the a foot portion of the L being fixed to the side wall and the leg portion of the L extends in parallel with the side wall to form a gap therebetween. The voice coil 21 passes through the gap and is held by the side wall and the clamping portion 220e, that is, the leg of the L-shaped member. The clamping portions serves as the coil holding portions.

In a modification, two coil bobbins are clamped and supported by the side walls and the clamping portions 220e, and the voice coils 21 are wound on the bobbins, respectively. In the case, the bobbins serve as the coil holding portions. The clamping portions 220e are similar in function and effect to that of the clamping portions 220d in the first embodiment.

Referring to FIGS. 14 through 17, a magnetic recording/reproducing mechanism according to a fifth embodiment is basically similar to the fourth embodiment in that the coil holding portions are formed on both side walls of the carriage body. The carriage assembly 22 is similar in structure to that illustrated in FIGS. 3 and 4. Similar parts are designated by like reference numerals and will not be described any longer.

In the fifth embodiment, the second projecting member 220b integral with the carriage body 24 has a pair of holding portions 226d of a thin plate shape facing and supporting the lower surfaces of the voice coils 21. The holding portions 226d extend from the second projecting member 220b towards but under the central yokes 202, respectively. The voice coils 21 are mounted on and adhered to the holding portions 226d, respectively.

Figure 15:
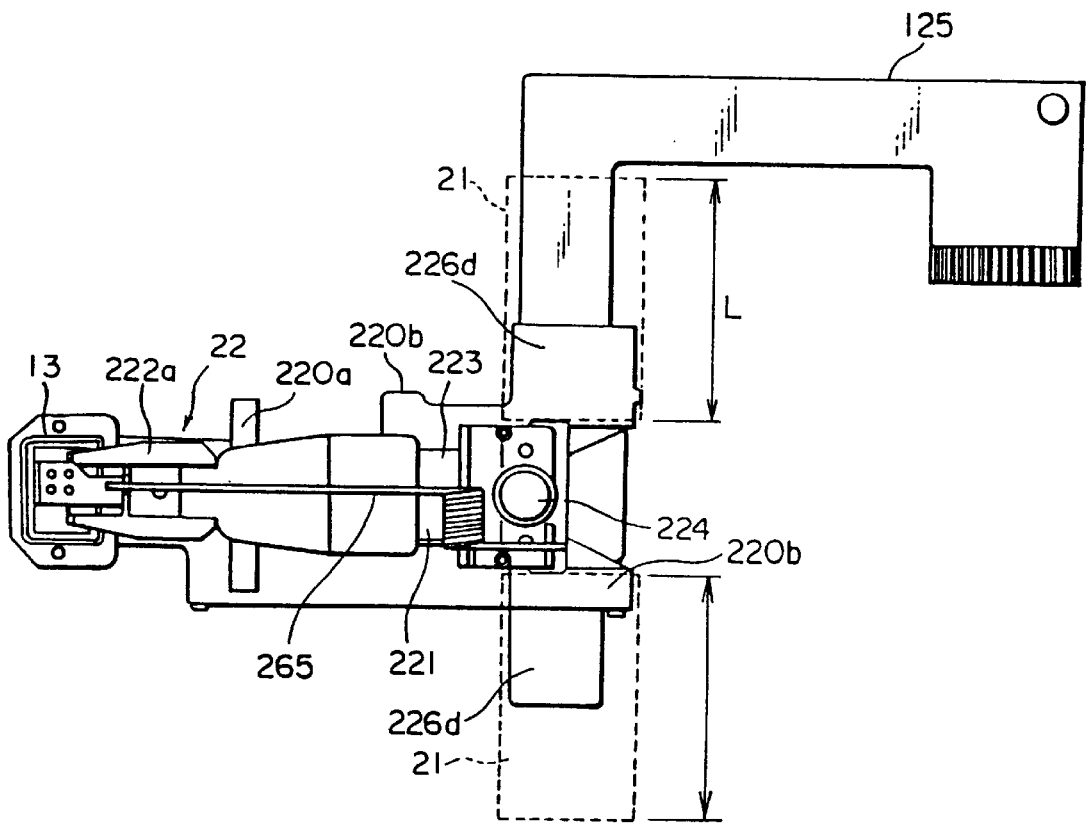
FIG. 15 is a plan view of a carriage assembly in FIG. 14.
Figure 16:
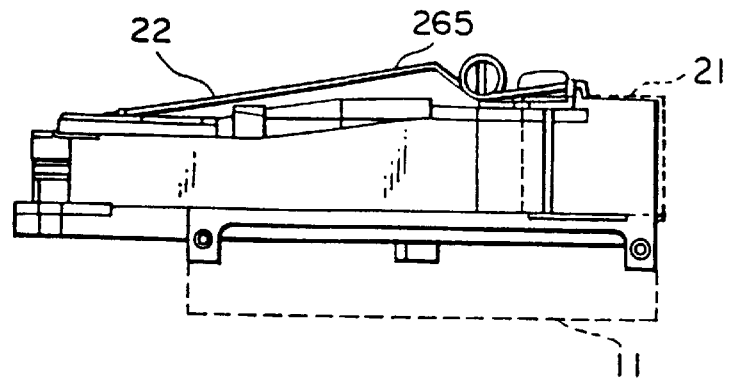
FIG. 16 is a side view of the carriage assembly in FIG. 15.
Figure 17:
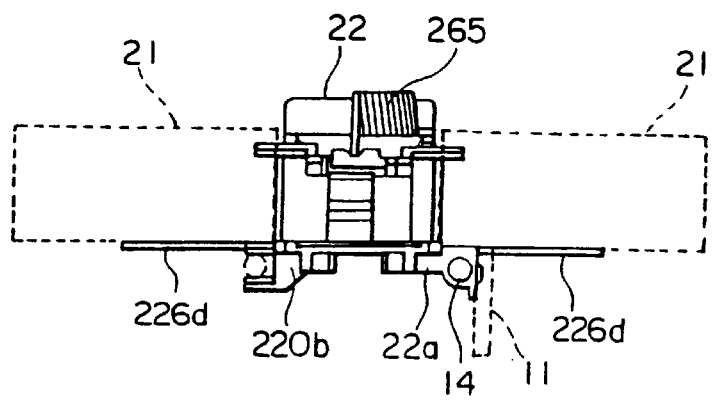
FIG. 17 is a rear view of the carriage assembly in FIG. 15.

As illustrated in FIG. 15, each voice coil 21 is assumed to have a longitudinal size L in a transversal direciton perpendicular to the predetermined direction. In this event, each holding portion 226d has a size slightly greater than L/2 in the transversal direction.

The voice coils 21 and the carriage body 24 are directly adhered by the adhesive. In addition, the holding portions 226d and the voice coils 21 are adhered by the adhesive. With this structure, the voice coils 21 are stably mounted and fixed to the holding portions 226d.

In FIG. 15, a wiring member 125 such as a flexible printed circuit (FPC) has one end connected to the carriage assembly 22 and the other end connected to a power supply terminal of an electronic apparatus (not shown).

In this embodiment, the voice coils 21 can be reliably fixed to the carriage assembly 22 with a correct position insured by means of the holding portions 226d.

In a modification of this embodiment, a coil bobbin is fixed to each of the holding portions 226d and the voice coil 21 can be wound and held on the bobbin. The bobbin can be formed into an integral form with the holding potion by a plastic molding process.

Figure 18:
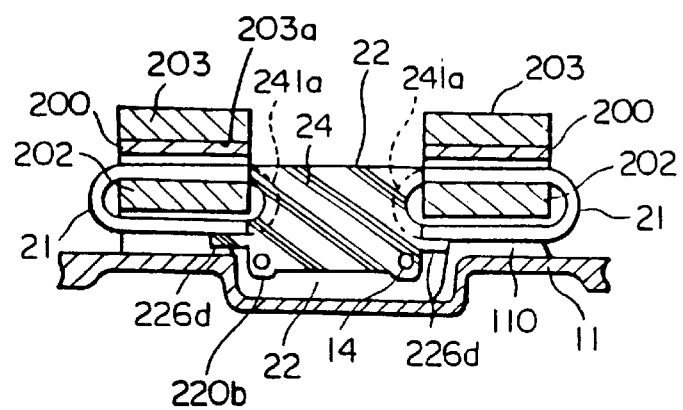
FIG. 18 is a sectional view of a magnetic recording/reproducing mechanism according to a sixth embodiment of this invention.

Referring to FIG. 18, a magnetic recording/reproducing mechanism according to a sixth embodiment is substantially similar to the fifth embodiment. Similar parts are designated by like reference numerals and will not be described any longer.

In the sixth embodiment, the carriage body 24 has a pair of the holding portions 226d and a pair of fitting portions 241a. Each of the holding portions 226d serves to hold a part of a lower peripheral surface of the voice coil 21. Each of the fitting portions 241a serves to hold one of arc-shaped side surfaces of the voice coil 21.

In a plastic molding process of the carriage body 24 with the holding portions 226d, the voice coils 21 are molded in and is fixedly held by the carriage body. That is, the one arc-shaped side surface of the voice coil 21 and the fitting portion 241a are integrally formed upon resin molding. Each of the holding portions 226d and each of the voice coils 21 are directly bonded together upon resin molding. With this structure, the voice coils 21 are stably supported and fixed by the fitting portions 241a. The fitting portion 241a is formed at least in a region corresponding to the arc-shaped side surface of the voice coil 21. The fitting portion 241a may be extended to the lower peripheral surface, the upper peripheral surface, and the inside of the arc-shaped side surface of the voice coil 21.

Although this invention has thus far been described in conjunction with the several preferred embodiments thereof, it will be understood that this invention is not restricted to the foregoing embodiments and can be modified in various manners within a scope of this invention. For example, this invention is applicable not only to the disk drive but also various-type recording/reproducing apparatuses such as an optical disk recording/reproducing device.

What is claimed is:

1. A recording/reproducing device for use in recording and reproducing data on and from a recording medium, the device moving a read/write head relative to said recording medium, comprising:

a carriage supporting said read/write head;

a guide fixedly disposed and slidably supporting said carriage for guiding said carriage in said moving direction; and a voice coil motor for driving said carriage in said moving direction, said voice coil motor comprising a voice coil having a coil axis and a magnetic circuit device generating a magnetic field;

said carriage having a coil holding portion projecting therefrom, said voice coil being fixedly held on said coil holding portion in the condition that said coil axis is arranged in said moving direction, said coil being applied with a driving electric current for driving said carriage;

said magnetic circuit device being fixedly disposed adjacent to said voice coil to generate a magnetic field intersecting the driving current flowing through said voice coil, said voice coil moving in the moving direction together with said carriage by an interaction of said driving current and said magnetic field;

wherein said magnetic circuit device comprises:

a center yoke fixedly disposed to extend in said moving direction through said voice coil and having opposite ends, said voice coil being movable along said center yoke;

a back yoke extending in parallel to said center yoke and having opposite end bent portions, each of said opposite end bent portions generally forming right angle, said opposite end bent portions being connected to said opposite ends of said center yoke to form an endless-shape member, said back yoke having a principal surface facing said center yoke with a space therebetween defined by said opposite end bent portions, said voice coil being partially disposed within said space; and a magnet attached onto said principal surface of said back yoke within said space, said magnet being magnetized in a direction perpendicular to said principal surface so as to produce said magnetic field;

wherein said carriage has a carriage body, and said coil holding portion is fixed to said carriage body;

wherein said coil holding portion is fixed onto a side wall of said carriage body, said voice coil being supported on and fixed to said coil holding portion; and wherein said coil holding portion comprises clamping means placed at both sides of said carriage body and integrally formed with said carriage body upon resin molding, said voice coil being clamped by said clamping means.

* * * * *